United States Patent Office 3,525,714
Patented Aug. 25, 1970

3,525,714
SELF-COLORED PHTHALOCYANINE - CONTAINING COPOLYESTERS AND METHOD FOR PRODUCTION THEREOF
Winfried Zeschmar, Kufstein-Schaftenau, Austria, assignor to Alpine Chemische Aktiengesellschaft Kufstein, Tyrol, Austria, a joint-stock company of Austria
No Drawing. Continuation of application Ser. No. 550,154, May 16, 1966. This application Feb. 14, 1969, Ser. No. 802,727
Claims priority, application Austria, May 19, 1965, A 4,569/65
Int. Cl. C08g *17/06, 17/08*
U.S. Cl. 260—47
10 Claims

ABSTRACT OF THE DISCLOSURE

Fiber and film-forming copolyesters exhibiting a uniform and resistant self-color containing esterified phthalocyanine-tetracarboxylic acid residues.

---

This application is a continuation of copending application Ser. No. 550,154, filed May 16, 1966, now abandoned.

The formation of polyesters by polycondensation of aliphatic or aromatic dicarboxylic acids or their polyester-forming derivatives (a) with aliphatic diols (b) and in certain cases aromatic dihydroxy compounds (c) and/or their glycol ethers (d) is known. In these processes metal phthalocyanines bearing 1 or 2 ester-forming groups in the molecule have been additionally used. Metal phthalocyanines containing 2 ester-forming groups in the molecule participate in the polycondensation reaction, thereby lengthening the polymer chains and imparting colour to the polycondensation product.

It has now been found that weakly cross-linked and/or branched copolyesters exhibiting a uniform and resistant self color are obtained when one or more aliphatic or aromatic dicarboxylic acids or their polyester-forming functional derivatives (a) are polycondensed with one or more aliphatic diols (b) and, optionally, with one or more glycol ethers of aromatic dihydroxy compounds (c) with the addition of small amounts of at least one phthalocyanine-tetracarboxylic acid or polyester-forming functional acid derivatives (d).

Two examples of aliphatic dicarboxylic acids (a) suitable for the present process are adipic and sebacic acid, while terephthalic, iso-phthalic, naphthalene-2,6-dicarboxylic and diphenyl-dicarboxylic acids are examples of the aromatic dicarboxylic acids whose use is preferred.

Examples of polyester-forming derivatives of these acids are their lower molecular alkyl esters, in particular their alkyl esters having 1 to 4 carbon atoms and preferably their dimethyl esters. It is expedient to start from terephthalic or iso-phthalic acid or their dimethyl esters, or from mixtures of these compounds.

Of the aliphatic diols (b), ethylene glycol is preferred, though others, e.g. 1,4-bis-(hydroxymethyl)-cyclohexane and neopentyl glycol, can be used, or alternatively glycol ethers, e.g. diethylene glycol. The aliphatic diols used may be, for example, those of the formula $$HO—Y—OH \quad (I)$$

where Y represents either $—(CR_2)_n—$, the two R's being, independently of each other, either hydrogen or lower molecular alkyl, the latter having preferably 1 to 5 carbon atoms, and $n$ being a whole number from 2 to 10; or alternatively Y represents $—CH_2—CH_2—O—CH_2CH_2—$ or the group

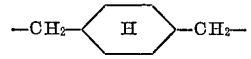

which may be substituted on the ring.

Glycol ethers of aromatic dihydroxy compounds (c) which are highly suitable for the present process are those of the formula

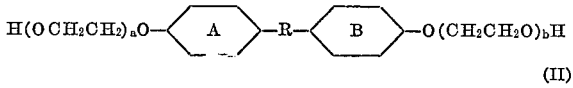

(II)

In formula II $a$ represents a whole number from 0 to 10, $b$ a whole number from 1 to 10, A and B represent rings which may be further substituted, and R represents the direct linkage or a group of formulae

$—CH_2CH_2—$, $—O—$, $—SO_2—$, $—CO—$ or $—NX—$ where X represents hydrogen or a lower molecular alkyl which has preferably up to 4 carbon atoms and may be substituted. A very suitable compound of Formula II is 2,2-bis-[4'-(2''-hydroxyethoxy)-phenyl]-propane.

The phthalocyanine-tetracarboxylic acids are likewise known. They may be metal-free or may contain, e.g., copper, magnesium, zinc, cadmium, aluminium, titanium, iron, cobalt or nickel as central atom. Often further advantages accrue from the use of the lower molecular alkyl esters of these acids, for example the methyl or ethyl esters or above all the glycol esters, which can be easily prepared by esterification of the appropriate acid with glycol in the temperature range of 250° to 300° C. under pressure.

The diols (b) are generally employed in excess in relation to the dicarboxylic acids (a), for example in amounts of 2.2 to 6 mols of the diol to 1 mol of the dicarboxylic acid, as is common practice in the production of polyethylene terephthalate. Depending on the amount of phthalocyanine-tetracarboxylic acids (d) employed, more or less pronounced branching and/or cross linking is obtained in the final product. The phthalocyanine-carboxylic acids or their polyester-forming derivatives are used in amounts of 0.01 to 3 mol percent, calculated on the dicarboxylic acids (a). For fibre- and film-forming copolyesters, amounts of approximately 0.01 to 0.5 mol percent of phthalocyanine-tetracarboxylic acids are employed. For some purposes the amount can be as much as 1 mol percent. The filaments formed by these weakly cross-linked copolyesters show good drawability and have excellent textile properties.

The glycol ethers of the dihydroxy compounds (c) are employed with special advantage in amounts of up to 40 mol percent, or preferably 2 to 15 mol percent for the production of fibre- and film-forming copolyesters, in each case on the amount of aromatic dicarboxylic acids employed. When the copolyesters are destined for injection or extrusion moulding, a higher content, e.g. 10 to 40 mol percent, is advantageous.

The new polyesters are obtained by one of the normal methods of polyester production, for example by polycondensation of terephthalic acid or a mixture of terephthalic acid and isophthalic acid or their lower molecular dialkyl esters, ethylene glycol in excess and up to 1 mol percent of phthalocyanine tetra-carboxylic acid or one of its lower molecular alkyl esters, in relation to the aromatic dicarboxylic acids, in the absence of oxygen and in the presence of esterification catalysts and, if necessary, stabilizers. The reaction is conducted in two stages; in the first polycondensation is carried out preferably at normal or excess pressure and at temperatures up to 270° C., and in the second it is terminated at reduced pressure in the temperature range of 250° to 300° C., or more particularly 270–280° C. Examples of suitable esterification catalysts are the oxides of the metals manganese, cobalt, zinc, lead and cadmium, and the salts formed by these metals and boric acid, phosphorous acid or the lower molecular aliphatic carboxylic acids, preferably those having 1 to 6 carbon atoms, for example managanese tetraborate, cobalt acetate, zinc oxide and lead oxide. Inorganic and organic phoshorus compounds, for example triphenyl phosphine, tridodecyl phosphine, diphenyl anthracenephosphine, tributyl phosphine, magnesium hypophosphite and disodium phosphate, minimize discoloration of the copolyesters and improve their heat resistance.

The copolyesters thus formed are notable for their high melting points, good crystallizing power and good mechanical properties. Their distinctive characteristic is that the extent of branching and/or cross linking in the polymer chains is dependent on the concetration of the phthalocyanine tetracarboxylic acids. This improves their end use properties, in particular the mechanical properties such as tenacity, power of extension and elasticity. The copolyesters can be processed by any of the normal methods, for example in the form of filament, film, granules or other shaped materials. They can if desired be blended with a second copolyester of different composition prior to processing.

In the following examples the parts and percentages are by weight and the temperatures in degrees centigrade. The intrinsic viscosity values given therein were determined with a solution of 1 gram of the copolyester in 100 milliliters of a 50:50 mixture of phenol and tetrachlorethane.

EXAMPLE 1

In an autoclave 6.4 parts of copper phthalocyaninetetracarboxylic acid and 700 parts of ethylene glycol are heated at 290–300° with stirring. After 2 hours the copper phthalocyanine-tetracarboxylic acid-ethylene glycol ester, which contains a few oligomers, is formed. It is transferred to a reaction kettle containing 800 parts of dimethyl terephthalate, to which 0.4 part of zinc oxide is subsequently added. The contents of the kettle are melted with the simultaneous introduction of oxygen-free nitrogen. The temperature is gradually increased until at 140° interchange of ester radicals sets in with distillation of methanol. After about 6 hours the temperature reaches 250° and the greater part of the excess glycol is distilled off. The pressure is then reduced to 10–20 mm. Hg until all the excess glycol has distilled off. The polycondensation reaction is continued at a pressure of less than 1 mm. Hg and at 280° C. After 4 hours a copolyester is obtained which has an intrinsic viscosity of 0.68 and melting point 259–262° C. It is of deep greenish blue color and can be spun and drawn to form filaments with good textile properties.

EXAMPLE 2

A mixture of 160 parts of terephthalic acid, 372 parts of ethylene glycol and 0.83 part of copper phthalocyaninetetracarboxylic acid is heated in an autoclave for 2 hours at 250–260°. Subsequently 0.1 part of lead oxide and 0.05 part of triphenyl phosphine are added, after which the reaction mixture is maintained for 1 hour at 270° and normal pressure. During this time the excess glycol distils off. After a further 30 minutes at 10–22 mm. Hg the pressure is reduced to below 1 mm. Hg, the temperature increased to 280° and the reaction brought to a close in 2 hours. The copolyester thus formed has an intrinsic viscosity of 0.62 and its melting point is at 250–254°. It can be spun to form filaments of deep greenish blue color.

EXAMPLE 3

A mixture of 30 parts of cobalt phthalocyanine-tetracarboxylic acid and 2320 parts of ethylene glycol is heated at 290–300° for 2 hours in an autoclave with stirring. The cobalt phthalocyanine-tetracarboxylic acid glycol ester is obtained in a glycol solution of deep blue color and contains small amounts of oligomers. This solution is transferred to a reaction kettle containing 3000 parts of dimethyl terephthalate and 1 part of zinc oxide, where interchange of ester radicals and polycondensation are accomplished to yield a copolyester of deep blue color. Its intrinsic viscosity value is 0.62, its melting point 261–263°, and it forms filaments with excellent textile properties.

EXAMPLE 4

In an autoclave 19.2 parts of copper phthalocyaninetetracarboxylic acid and 2000 parts of glycol are heated for 2 hours at 290–300° with stirring. A deep blue glycol solution of the copper phthalocyanine-tetracarboxylic acid glycol ester is obtained, which contains small amounts of oligomers. This solution is run into a reaction vessel containing 5000 parts of dimethyl terephthalate, 2000 parts of glycol, 489 parts of 2,2-bis-[4'-(2" - hydroxyethoxy)-phenyl]-propane and 3.5 parts of zinc oxide, where interchange of ester radicals and polycondensation are carried out. The deep blue copolyester thus formed has an intrinsic viscosity of 0.70, melts at 232–235° and can be spun to form filaments with good textile properties.

What I claim is:

1. A film- and fiber-forming solid copolyester produced by reacting a mixture consisting essentially of (a) at least one substance from the group consisting of aliphatic dicarboxylic acids, aromatic dicarboxylic acids, and their 1–4 carbon atoms alkyl esters, (b) an aliphatic diol, (c) 0 to 40 mole percent, based on the amount of dicarboxylic acid, of a glycol ether of an aromatic dihydroxy compound, and (d) about 0.01 to 3 mole percent, based on the amount of dicarboxylic acid of at least one substance from the group consisting of phthalocyanine-tetracarboxylic acids and the esters of phthalocyanine-tetracarboxylic acids and an aliphatic diol.

2. A copolyester according to claim 1 in which (d) the phthalocyanine-tetracarboxylic acid contains as the central atom a metal from the group consisting of copper, magnesium, zinc, cadmium, aluminum, titanium, iron, cobalt and nickel.

3. A copolyester according to claim 2 in which said (a) component is a member of the group consisting of the 1–4 carbon atom alkylesters of adipic acid, sebacic acid, terephthalic acid, isophthalic acid, naphthalene-2, 6-dicarboxylic acid and diphenyldicarboxylic acid, said (b) component is a member of the group consisting of ethylene glycol, 1,4-bis-(hydroxymethyl) - cyclohexane, neopentyl glycol and diethylene glycol and said (c) component is 2,2-bis-[4' - (2" - hydroxymethoxy) - phenyl] propane.

4. A copolyester according to claim 2 in which said (a) component is a member of the group consisting of the 1–4 carbon atom alkyl esters of terephthalic acid, isophthalic acid, naphthalene - 2,6 - dicarboxylic acid and diphenyldicarboxylic acid, and said (b) component is a member of the group consisting of ethylene glycol and 1,4-bis(hydroxymethyl)-cyclohexane.

5. A copolyester according to claim 3 in which said (a) component is dimethylterephthalate and said (b) component is ethylene glycol.

6. A copolyester according to claim 4 in filament form.

7. A copolyester according to claim 4 in film form.

8. A copolyester according to claim 3 in which the metal is copper, the (a) component is terephthalic acid, and the (b) component is ethylene-glycol.

9. A copolyester according to claim 4 wherein the (c) component is 2,2-bis-[4'-(2''-hydroxyethoxy)-phenyl] propane.

10. A copolyester according to claim 3 wherein the metal is cobalt, the (a) component is dimethyl terephthalate and the (b) component is ethylene glycol.

References Cited
UNITED STATES PATENTS

| | | | |
|---|---|---|---|
| 3,002,942 | 10/1961 | Zoetbrood | 260—22 |
| 3,138,611 | 6/1964 | Zickendraht | 260—314.5 |
| 3,301,814 | 1/1967 | Parry | 260—37 |

WILLIAM H. SHORT, Primary Examiner

L. L. LEE, Assistant Examiner

U.S. Cl. X.R.

260—33.4, 75